No. 733,471. Patented July 14, 1903.

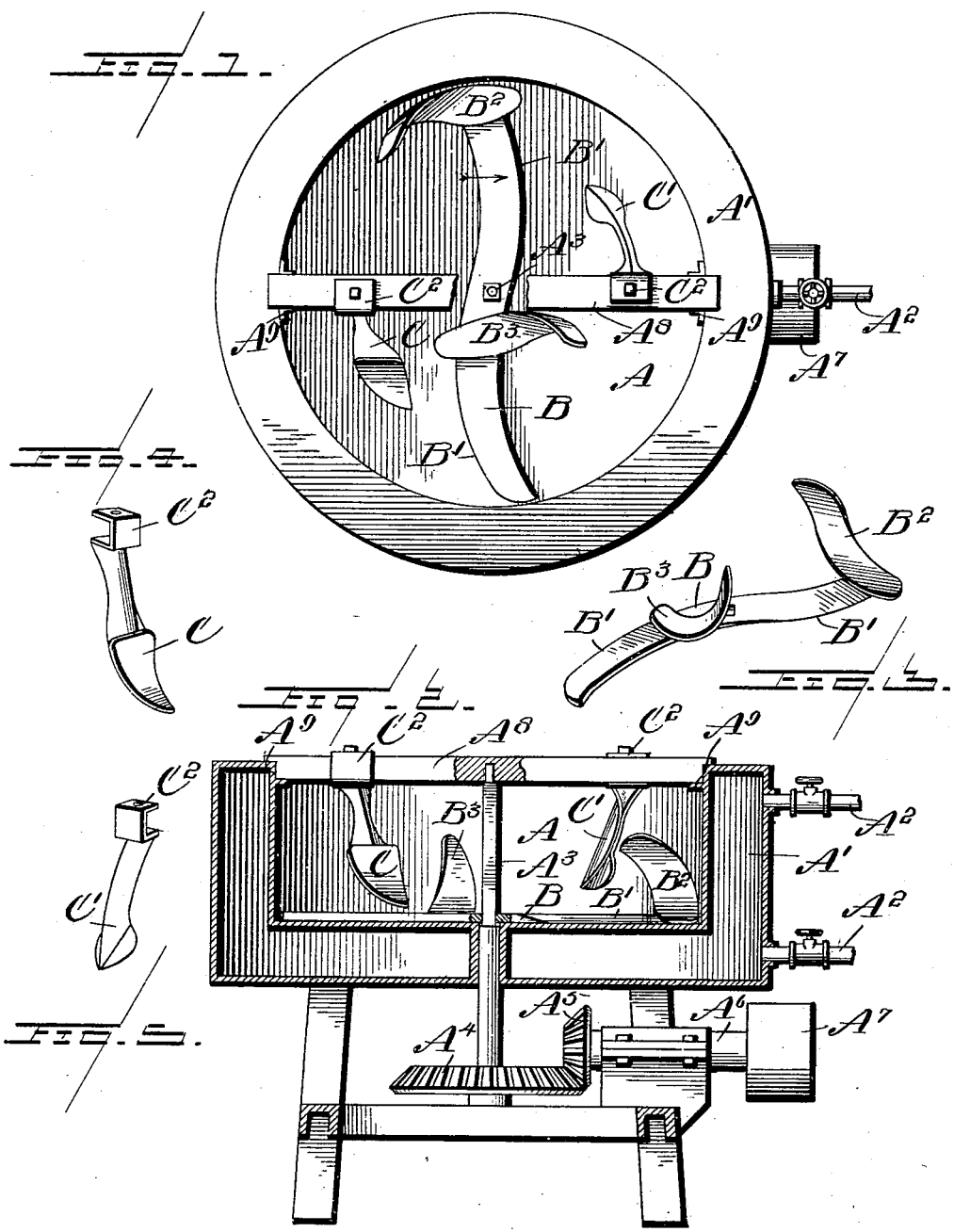

UNITED STATES PATENT OFFICE.

SAMUEL J. ELLIS AND CHRISTEN NEILSEN, OF MEMPHIS, TENNESSEE.

STIRRER FOR COOKING-RECEPTACLES.

SPECIFICATION forming part of Letters Patent No. 733,471, dated July 14, 1903.

Application filed March 28, 1903. Serial No. 150,032. (No model.)

*To all whom it may concern:*

Be it known that we, SAMUEL J. ELLIS and CHRISTEN NEILSEN, citizens of the United States, residing at Memphis, in the county of Shelby, State of Tennessee, have invented certain new and useful Improvements in Stirrers for Cooking-Receptacles, of which the following is a specification, reference being had therein to the accompanying drawings.

This invention relates to a stirrer for cooking-receptacles, and particularly to a construction embodying a scraper adapted to contact with the bottom of the receptacle.

The invention has for an object to provide a rotatable scraper with one or more plows with which the material to be cooked is removed from the bottom of the receptacle and turned completely over, so that a thorough mixture is effected and even cooking of the mass secured.

Another object of the invention is to provide fixed plows above the scraper which prevent the rotation of the body of material in the travel of the movable plows and also break up any masses of such material.

Other and further objects of the invention will be hereinafter set forth, and the novel features thereof defined by the appended claims.

In the drawings, Figure 1 is a plan showing the invention applied to a cooking-receptacle. Fig. 2 is a vertical section thereof. Fig. 3 is a detail perspective of the scraper and the plows carried thereby, and Figs. 4 and 5 are detail perspectives of two forms of fixed plows used in connection with the scraper.

Like letters of reference refer to like parts in the several figures of the drawings.

The letter A designates a cooking-receptacle, which may be of any desired size or character and heated in any preferred manner—for instance, by means of a steam chest or chamber A' surrounding same and connecting with pipes $A^2$. This receptacle is provided with a central shaft $A^3$, rotatably mounted therein and adapted to be driven in any desired manner—for example, by means of a beveled gear $A^4$, carried at its lower portion and meshing with the beveled pinion $A^5$ upon the driving-shaft $A^6$, which has secured thereto a pulley $A^7$ to receive power from any suitable source. The upper end of the shaft $A^3$ is supported by means of a cross-bar $A^8$, resting at opposite sides upon the edges of the receptacle A, where suitable seats $A^9$ may be provided, if desired.

Secured to the shaft $A^3$ is a scraper or sweep B, of any desired character, preferably having beveled or sharpened edges B' at opposite sides thereof upon each side of its pivot. This scraper is provided at suitable points with turning-plows, adapted to lift and turn over the material freed from the bottom of the receptacle by the scraper. A desirable form or illustration of these plows is presented herein, where the plow $B^2$ is secured to the free end of the scraper at one side of its pivot, while at the opposite side of the pivot a similar plow $B^3$ is provided at the inner end of the free arm. It will thus be seen that the plow $B^2$ will throw the material inward from the edge of the receptacle and at the same time turn the material over, while the plow $B^3$ removes the material from around the driving-shaft, likewise turning the same over.

Upon the cross-bar $A^8$ or upon any other suitable support the fixed plows or cutters C and C' are mounted, the same extending downward, so as to lie in a curved path extending between the plow $B^2$ and the shaft $A^3$ and also between the plow $B^3$ and the free end of the scraper. These fixed plows may be of any desired shape and are not adapted or intended to turn the material, but to break up any masses or lumps thereof and also to prevent rotation of the material with the scraper and the other plows. These fixed plows may be secured in position in any desired manner—for instance, by means of a clamp $C^2$, bolted or otherwise adjustably affixed to the cross-bar $A^8$, and they may be of any desired configuration suitable to the work, it being desirable that they should be curved so as to lie in a curved path, as shown in Fig. 1.

By providing a scraper or sweep at the bottom of the cooking-receptacle with the turning-plows, in connection with the fixed plows or cutters suspended above the scraper, it will be seen that the material to be cooked or heated is raised from the body of the receptacle in a circular movement of the scraper and plows and thoroughly mixed as it is turned completely over, so as to secure an even and thorough cooking throughout the mass and prevent a scorching of the material upon the bottom of the receptacle while the top thereof is not sufficiently cooked. The fixed plows or cutters by engaging the mass of material in the receptacle hold the same against rotary movement with the turning-plows and also break up any lumps, so as to evenly distribute and overturn the material in the receptacle. It will be seen that the scraper keeps the bottom of the receptacle clean and tends to throw the material toward the outer edges, while the plow attached to the free end of the scraper carries the material upward and throws it backward toward the center of the receptacle, thus giving all parts of the mass equal opportunity to cook evenly.

It will be obvious that changes may be made in the details of construction and configuration without departing from the spirit of the invention as defined by the appended claims.

Having described our invention and set forth its merits, what we claim, and desire to secure by Letters Patent, is—

1. In a device of the class described, a cooking-receptacle, a scraper disposed upon the bottom thereof, means for rotating said scraper, and a turning-plow carried by said scraper.

2. In a device of the class described, a cooking-receptacle, a scraper disposed upon the bottom thereof, means for rotating said scraper, a turning-plow carried by said scraper, and a fixed depending plow or cutter at one side of said turning-plow.

3. In a device of the class described, a receptacle, a rotatable sweep disposed upon the bottom thereof, and a turning-plow carried at a free end of said sweep.

4. In a device of the class described, a receptacle, a rotatable sweep disposed at the bottom thereof, a turning-plow carried at a free end of said sweep, and a second turning-plow carried by said sweep adjacent to the axis thereof and upon the opposite side of said axis from the first-mentioned turning-plow.

5. In a device of the class described, a receptacle, a rotatable sweep disposed at the bottom thereof, a turning-plow carried at a free end of said sweep, a second turning-plow carried by said sweep adjacent to the axis thereof and upon the opposite of said axis from the first-mentioned turning-plow, a fixed supporting-bar, and a depending plow or cutter carried by said bar and extended in a curved path at one side of the path of the turning-plows.

6. In a device of the class described, a cooking-receptacle having a central rotatable shaft therein, a scraper carried by said shaft, turning-plows upon said scraper at the free end thereof and at its axis, and fixed plows or cutters extended in opposite directions at one side of each turning-plow.

In testimony whereof we affix our signatures in presence of two witnesses.

SAMUEL J. ELLIS.
CHRISTEN NEILSEN.

Witnesses:
H. C. ELLIS,
W. J. ELLIS.